(12) United States Patent
Hosoya (10) Patent No.: US 6,293,634 B1
(45) Date of Patent: Sep. 25, 2001

(54) SPRING BAR SOLENOID IN ABS BRAKE SYSTEM (75) Inventor: Yukio Hosoya, Hamakita (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/118,999

(22) Filed: Jul. 20, 1998

(30) Foreign Application Priority Data

Jul. 25, 1997 (JP) .................................................... 9-215549

(51) Int. Cl.[7] .................................................... B60T 8/36
(52) U.S. Cl. .................................. 303/119.2; 303/119.3; 137/88
(58) Field of Search ........................... 303/119.2, 119.3, 303/116.4, DIG. 10; 137/88

(56) References Cited

U.S. PATENT DOCUMENTS

| 5,386,337 | * | 1/1995 | Schoetl | 303/119.3 |
| 5,439,279 | | 8/1995 | Linkner, Jr. et al. | 303/119.3 |
| 5,820,228 | * | 10/1998 | Schneider et al. | 303/119.3 |
| 5,823,507 | * | 10/1998 | Inden et al. | 303/119.2 |
| 5,842,753 | * | 12/1998 | Staib et al. | 303/119.3 |

FOREIGN PATENT DOCUMENTS

WO 94/25320 * 11/1994 (WO) ................................ 303/119.3

* cited by examiner

Primary Examiner—Matthew C. Graham
(74) Attorney, Agent, or Firm—Arent Fox Kintner Plotkin & Kahn, PLLC (57) ABSTRACT An object of this invention is to provide a hydraulic brake control device which has a simple structure for the effective holding of the coil unit, for preventing breakage of the electric connection of the lead wire, and for assuring a long lasting electric connection. The coil holding board 80 has protuberances 83, 84 elastically contacting the bottom portion of the coil unit 52. The board is assembled with the opening side of the cover 60. The coil unit 52 is frictionally engaged with the cover 60 to be held only by the elastic force of the coil holding board 80 or with elastic material 22 inserted between the cover 60 and the top portion of the coil 52.

12 Claims, 6 Drawing Sheets

Fig. 6

SPRING BAR SOLENOID IN ABS BRAKE SYSTEM

BACKGROUND OF THE INVENTION

This invention relates to a hydraulic brake control device for a motor vehicle with an antilock brake control system or a traction control system. More specifically, this invention provides a hydraulic brake control device which improves a holding means for a coil unit of a solenoid valve.

A known hydraulic brake control device is an integral type device which comprises a hydraulic unit with a plural number of solenoid valves and an electronic control unit.

Each solenoid valve comprises a valve unit having the valve mechanism within a dome-shaped sleeve and a donut-shaped coil portion provided outside the valve unit. In order to assemble the solenoid valve, the valve unit is installed in a valve block of the hydraulic unit; the coil unit is installed in a cover of the electronic control unit; and is assembled onto the valve block. This type of hydraulic brake control device is disclosed in the Japanese Opened Public Patent Application Number Heisei 7-215192.

In the above-described hydraulic brake control device, the coil unit is elastically supported between the top portion of the coil unit and the case via a spring material. A lead wire from the coil unit is extended through the lid portion of the case to be directly connected to the control board provided on the top surface of the case.

The above-described hydraulic brake control device has the following problems.

The hydraulic unit and the electronic control unit are individually manufactured and then assembled. The elastic effect of the spring becomes effective only after the coil unit is assembled on the valve block. Therefore, the coil unit is freely movable when transporting the electronic control unit with the coil unit before assembly with the hydraulic unit.

Accordingly, during transportation, the coil may move freely about which can apply a pulling force on the lead wire. In this manner, the electric connection of the lead wire may easily be broken.

Assembling the coil unit with or disassembling the coil unit from the valve unit can cause a compressive force or a pulling force on the lead wire, which could be a cause of breakage of the lead wire as well as breakage of the electric connection between the lead wire and the control board.

Thus, a special treatment must be done to provide a holding mechanism between the coil unit and the housing of the case during transport prior to assembly, which increases the cost of the device.

OBJECTS AND SUMMARY OF THE INVENTION

This invention is to resolve the above-identified problems, and to that end, this invention provides a hydraulic brake control device, which has a simple structure to hold the coil unit.

A further object of this invention is to provide a hydraulic brake control device, which prevents the electric connection of the lead wire of the coil unit from being broken, thereby assuring a long lasting electric connection.

The first aspect of the invention is to provide a hydraulic brake control device, which comprises a hydraulic unit with a valve unit of a solenoid valve, a control board installed in a cover covering one side surface of the hydraulic unit, and an electronic control unit with a coil unit of the solenoid valve, wherein a coil holding board, elastically contacted with a bottom portion of the coil unit, is installed at the opening side of the cover and the coil unit is frictionally engaged by the coil holding board and a lid of the cover.

The second aspect of the invention is to provide a hydraulic brake control device, which comprises a hydraulic unit with a valve unit of a solenoid valve, a control board installed in a cover covering one side surface of the hydraulic unit, and an electronic control unit with a coil unit of the solenoid valve, wherein a coil holding board is installed at the opening side of the cover, the coil unit is installed between a lid of the cover and the coil holding board, an elastic material is inserted between a top portion of the coil unit and the lid or between a bottom portion of the coil unit and the coil holding board, and the coil unit is frictionally engaged by the coil holding board and the lid.

The third aspect of this invention is to provide an hydraulic brake control unit as above, wherein a plural number of protuberances fix the position of the coil unit at the lid of the cover and the coil holding board.

The fourth aspect of this invention is to provide a hydraulic brake control unit as above, wherein protuberances are formed on one side of the coil holding board and the coil holding board has an elastic effect by being abutted against the bottom surface of the coil unit or a valve block of the hydraulic unit via the protuberances.

The fifth aspect of this invention is to provide a hydraulic brake control unit as above, wherein protuberances are formed on both surfaces of the coil holding board and the coil holding board has an elastic effect by being abutted against a bottom surface of the coil unit and a valve block of the hydraulic unit via the protuberances.

The sixth aspect of this invention is to provide a hydraulic brake control unit as above, wherein a hole is formed in the lid of the cover, into which a convex portion of the coil unit is engaged and the rotation of the coil unit is restricted by the engaging of the convex portion of the coil unit into the hole of the lid of the cover.

The seventh aspect of this invention is to provide a hydraulic brake control unit as above, wherein a hole is formed in the lid of the cover, into which a convex portion of the coil unit is engaged, the rotation of the coil unit is restricted by the engaging of the convex portion of the coil unit into the hole of the lid of the cover, and an elastic material with a sealing effect is provided between the lid of the cover and the top of the coil unit.

The eighth aspect of this invention is to provide a hydraulic brake control unit as above, wherein a cavity is formed on the inner circumference of the side surface of the cover, and the periphery of the coil holding device is engaged in the cavity.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

This embodiment is explained with reference to the following diagrams.

Figure 1:
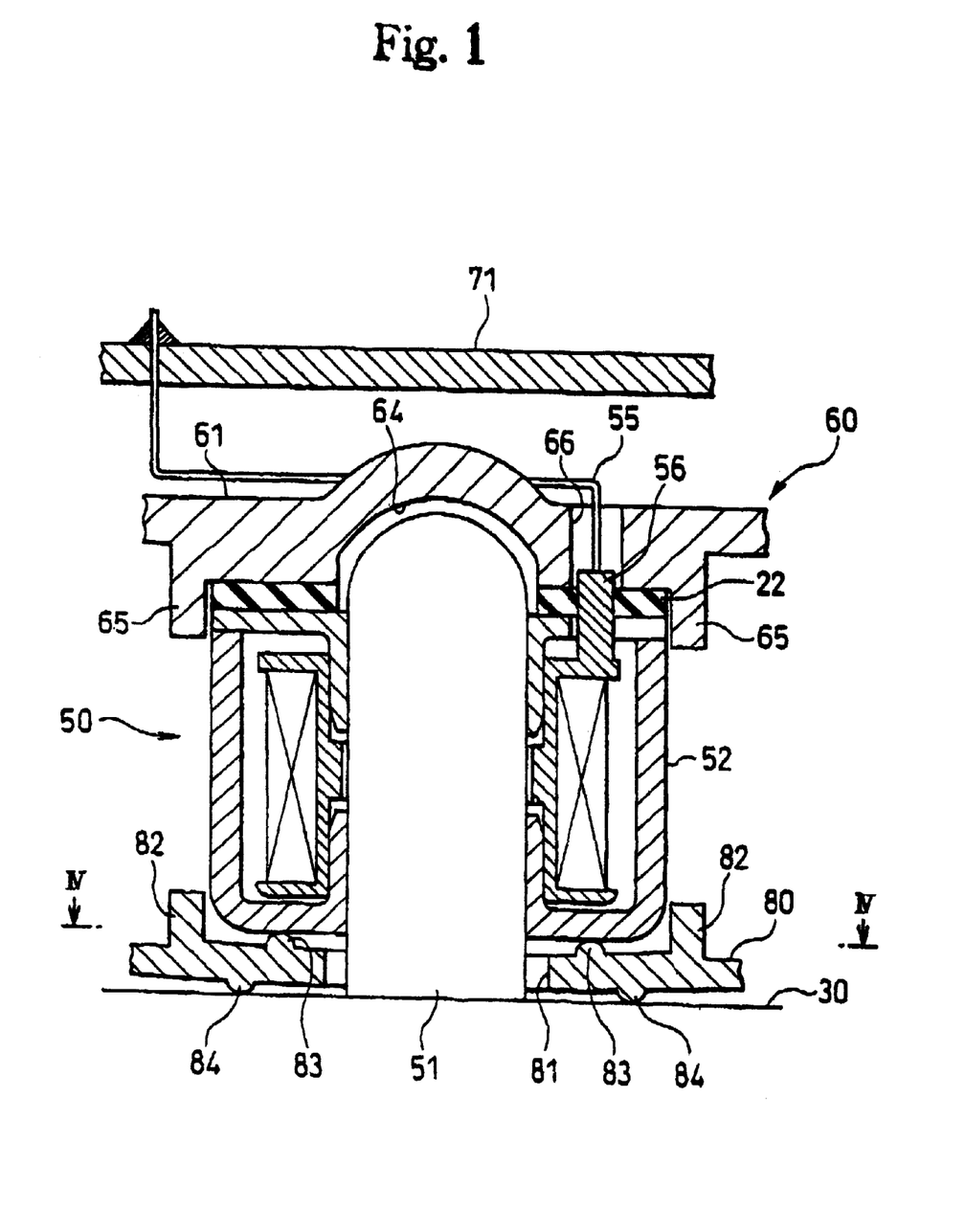
FIG. 1 is an enlarged cross-section view of the partially cross-sectioned solenoid valve.
Figure 2:
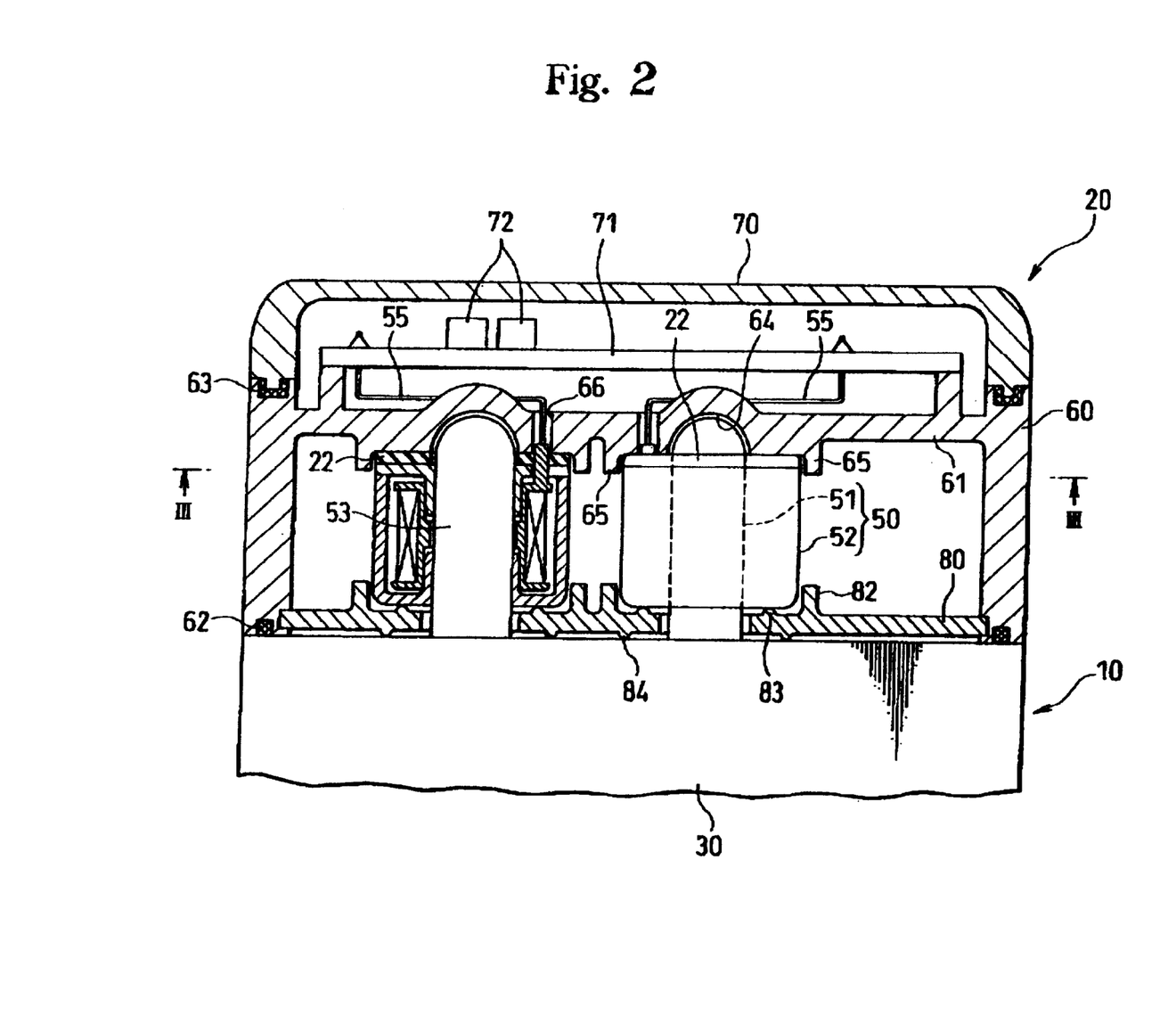
FIG. 2 is a partially omitted lateral view of the integral type hydraulic brake control device.

FIGS. 1 and 2 illustrate an example of the hydraulic brake control device integrating the hydraulic unit 10 and the electronic control unit 20.

The hydraulic unit 10 has a valve block 30. A plural number of solenoid valves 50 are installed in the valve block 30 in which the brake fluid flows. Devices such as a motor, not shown in the diagram, driving a hydraulic pump are provided in the valve block 30. The known devices use these components, and an explanation thereof will be omitted here.

The solenoid valve 50 itself comprises a valve unit 51, having a valve mechanism inside of the dome-shaped sleeve 53, and a cylindrical coil unit 52 covering the valve unit 51. The valve unit 51 is equipped with a normally open or a normally closed valve mechanism in the dome-shaped sleeve 53. Electromagnetic force from the coil unit 52 is transmitted to open and close the valve mechanism inside. The valve unit 51 is installed in the installation hole of the valve block 30 and is fixed in position by a known procedure such as caulking. The structure of the assembly of the coil unit 52 will be explained later.

In FIG. 2, the electronic control unit 20 comprises the solenoid valve cover 60 covering the solenoid valves 50, the Electronic Control Unit (ECU) cover 70 covering the solenoid valve cover 60, the control board 71 in the the ECU cover 70, the coil holding board 80 set at the opening side of the solenoid valve cover 60, and the coil unit 52 frictionally engaged between the lid 61 of the solenoid cover 60 and the coil holding board 80.

The control board 71 is equipped with the electric and electronic components 72 necessary for the antilock brake control and is provided on the lid 61 of the solenoid valve cover 60.

Sealing materials 62, 63 are provided on the upper and lower opening end surfaces of the solenoid valve cover 60. The solenoid valve cover 60 is fixed by a plural number of installation bolts screwed into the valve block 30, etc.

A connector (not shown in the diagram) directly and electrically connectable with an outer harness is formed at one portion of the ECU cover 70.

Figure 3:
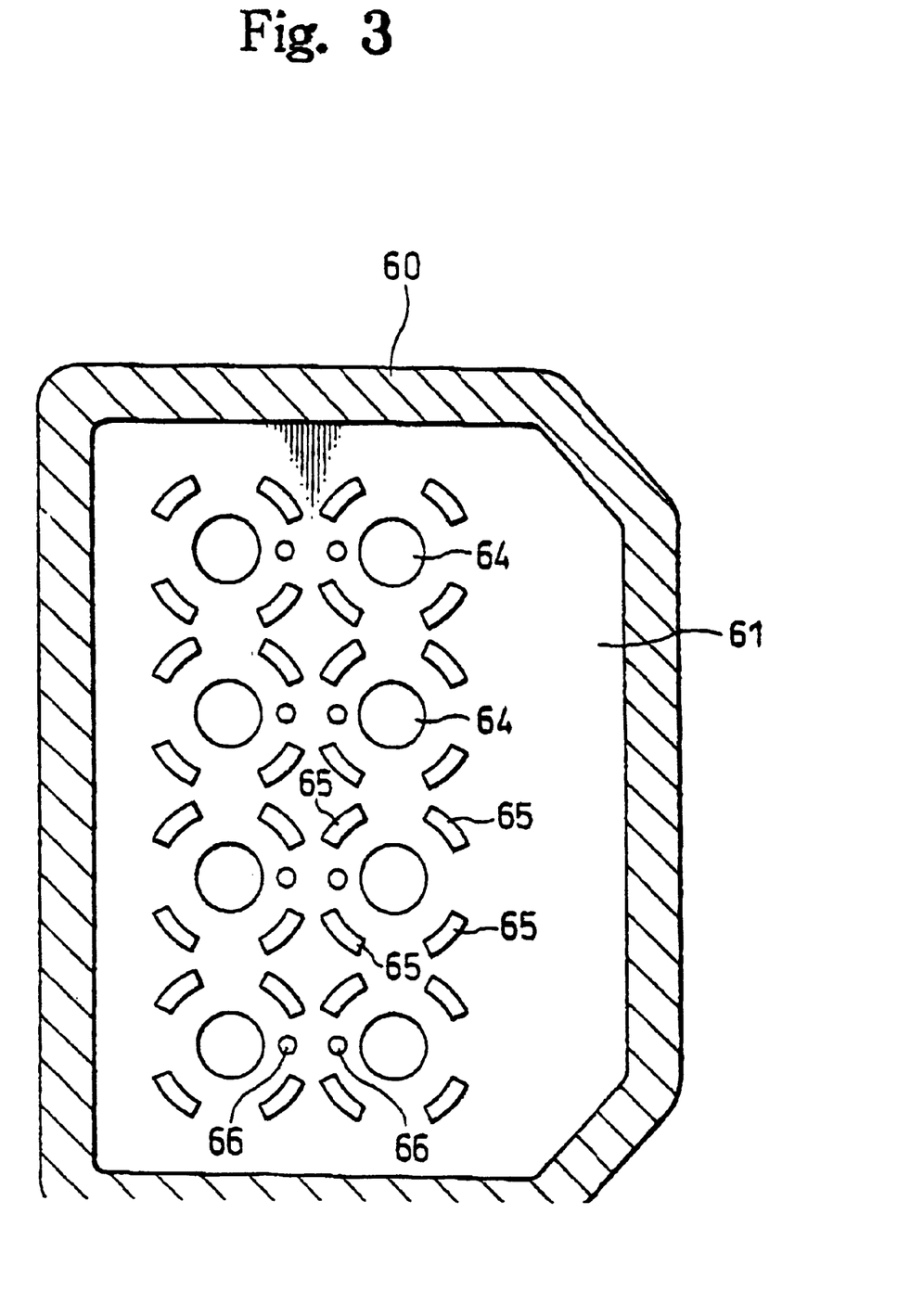
FIG. 3 is a cross-section view without the solenoid valve taken along a line III—III in FIG. 2.

As is shown in FIG. 1, FIG. 2, and FIG. 3, the lid 61 of the solenoid valve cover 60 has a concave portion 64 formed for the top portion of the valve unit 51 to be installed according to the position of the solenoid valve 50. A plural number of protuberances 65 adjacent to the concave portion 64 and covering the top portion of the coil unit 52 are formed to fix the position of the solenoid valve 50.

The cylindrical top portion of the coil unit 52 is not the primary means for positioning but the plural number of the protuberances are used to fix the position to realize a compact design.

As an enlarged view in FIG. 1 and as shown in FIG. 3, a plural number of holes 66 are provided in the lid 61 of the solenoid valve cover 60. The holes 66 function as the connection holes to the control board 71 through the respective lead wire 55 extending from the coil unit 52. At the same time, the holes 66 help to restrict the free rotation of the coil unit 52 by being engaged with a convex portion 56 formed on the coil unit 52 itself. If the inner diameter of the holes 66 is designed to be slightly larger than the convex portion 56, the convex portion 56 and the holes are smoothly engaged to improve assemblability.

An elastic material 22 inserted between the top portion of the coil unit 52 and the lid 61 surrounded by the protuberances 65 applies force urging the coil unit 52 in a direction away from the lid 61 with the reaction force of the lid 61. The elastic material 22 may be a rubber material having a donut shape. A hole is formed in the elastic material 22, through which the convex portion 56 of the coil unit 52 is inserted. The elastic material 22 has a function to frictionally engage the coil unit 52 with the solenoid cover 60 as well as a function to work as a sealing material to seal the holes 66 of the lid 61.

The elastic material 22 is not limited to a rubber material having a donut-shape. A variety of materials and shapes with a spring effect may be used instead of the elastic material described above.

This invention is designed to cause a frictional engagement to hold the coil unit 52 at the solenoid valve cover 60 by using the elastic material 22 and the below-described coil holding board 80.

The coil holding board 80 is a board which determines the position of the lower portion of the coil unit 52 and which has a function to apply an elastic force on the coil unit 52 in the direction of the lid 61. The coil holding board 80 has an opening 81 through which the valve unit 51 is inserted according to the position of the respective solenoid valve 50.

Figure 4:
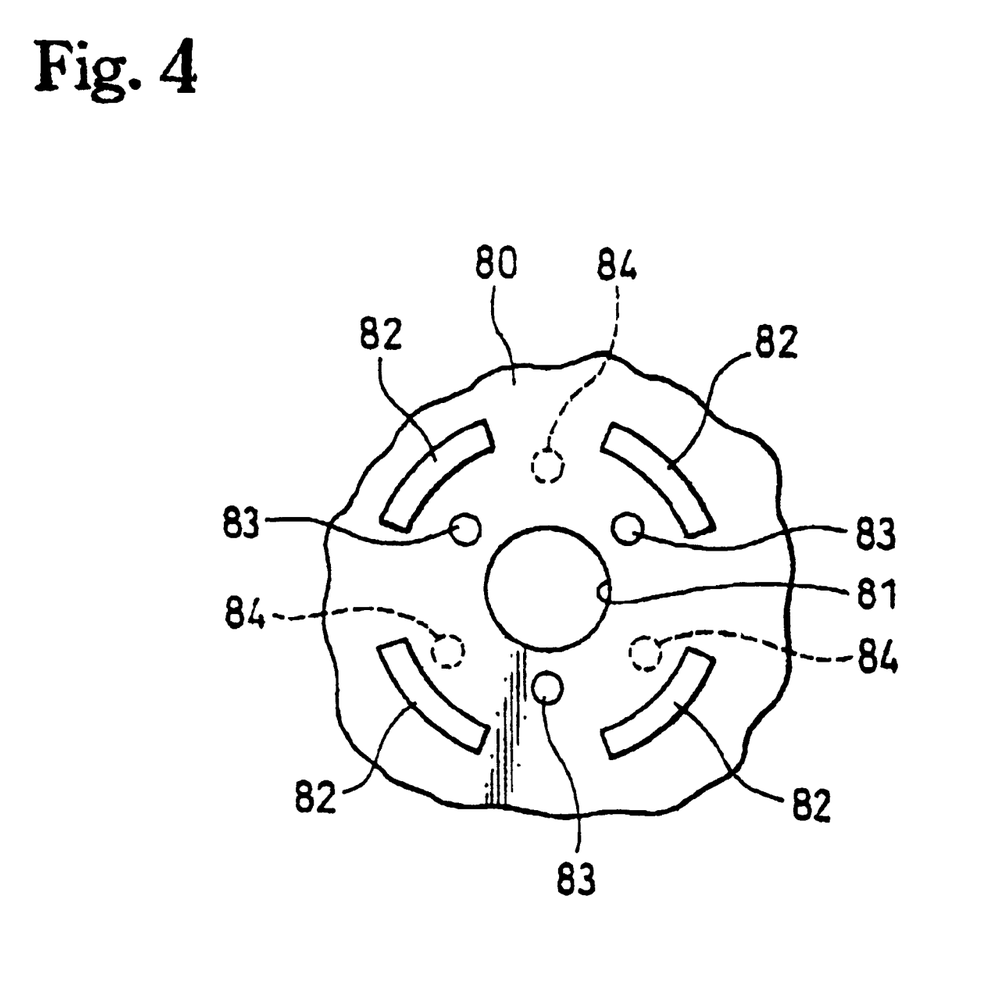
FIG. 4 is a cross-section view taken along a line IV—IV of FIG. 1.

Further, as shown in FIGS. 1 and 4, protuberances 82 are formed adjacent to the opening 81 of the coil holding board 80. The lower portion of the coil unit 52 is installed inside the plural protuberances 82.

The inner diameter of the above-described protuberances 65 of the solenoid valve cover 60 is designed to be slightly larger than the inner diameter of protuberances 82. A small clearance or relative difference is formed between the inner diameters of the respective protuberances 65 and the respective protuberances 82. This increases the assemblability.

The spring force is created on the coil holding board 80 by forming upper protuberances 83 and lower protuberances 84 on both board surfaces of the coil holding board 80. Here, the respective lower protuberances 84 which contact the valve block 30 are formed at different positions from the upper protuberances 83 abutting against the bottom surface of the coil unit 52.

Figure 5:
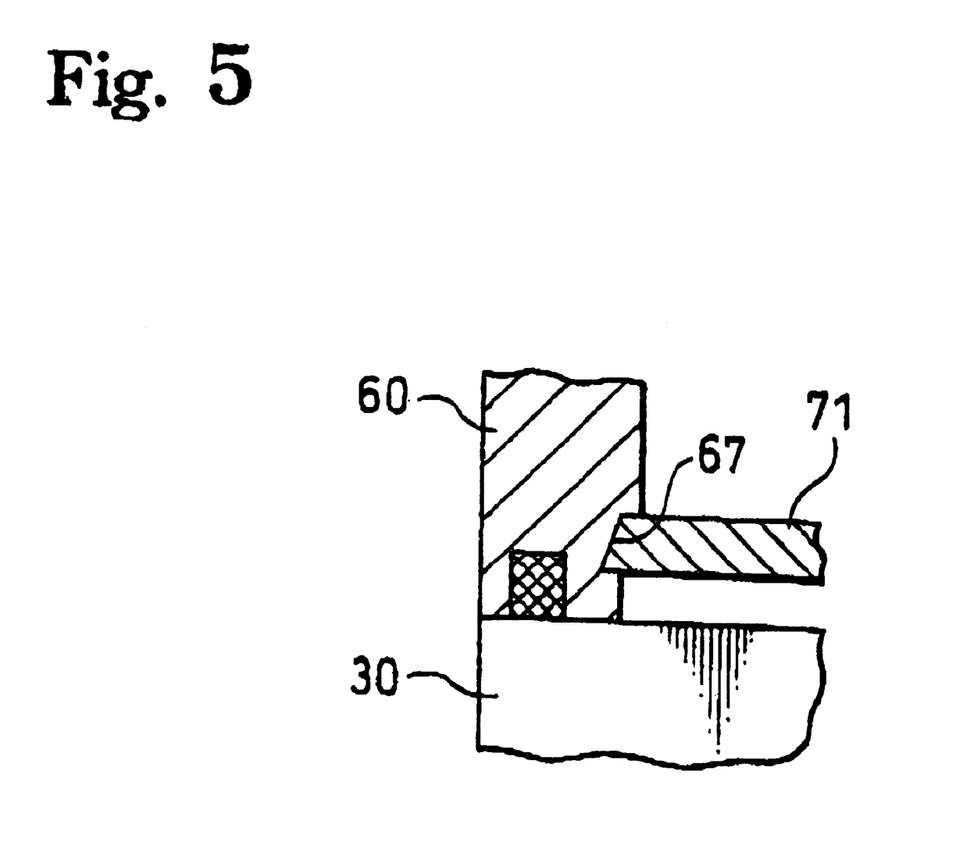
FIG. 5 is an enlarged view of the abutting portion of the solenoid valve cover and the valve block.

FIG. 5 is an enlarged view of the abutting portion of the solenoid valve cover 60 assembled with the coil holding board 80 against the valve block 30. In FIG. 5, a cavity 67 is formed along the inner circumference of the inside side surface of the solenoid valve cover 60. The periphery of the solenoid valve cover 60 may be engaged by the board 80 during assembly.

The coil holding board 80 has flexibility and may be pulled out for the parts to be disassembled.

Figure 6:
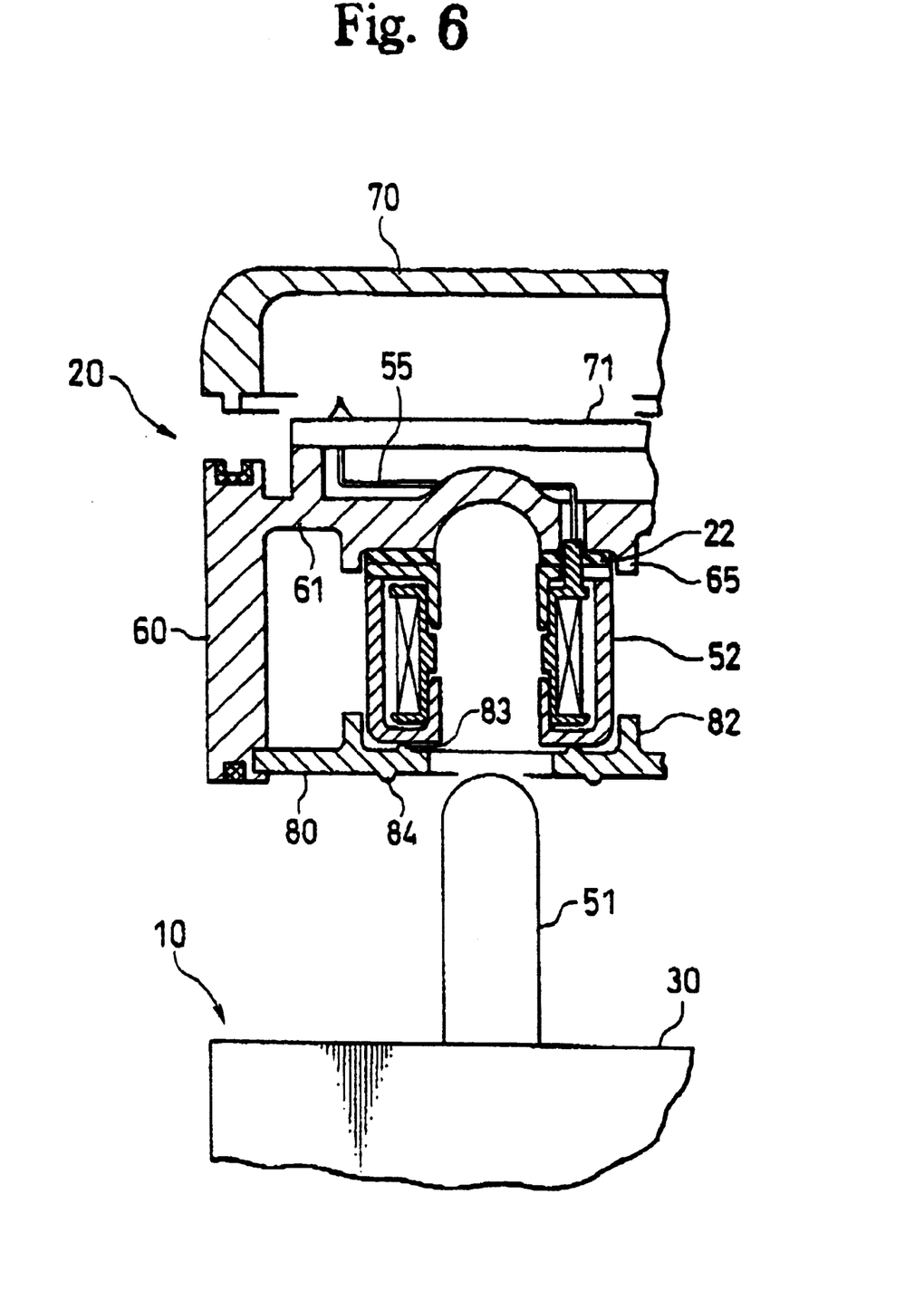
FIG. 6 is an exploded assembly view of the hydraulic brake control device.

FIG. 6 is an explanation view of the assembly of the hydraulic brake control device.

The valve unit 51 of the solenoid valve 50 is pre-assembled in the hydraulic unit 10.

The coil unit 52 of the solenoid valve 50 is assembled with the electronic control unit 20 by following the process below. After setting the elastic material 22 inside the lid 61 of the solenoid valve 60, the lead wires 55, 55 of the coil unit 52 are extended through the lid 61 and are electrically connected to the control board 71 by a known technique such as soft solder. The coil holding board 80 is engaged with the opening portion of the solenoid valve cover 60; the upper and lower portions of the coil unit 52 are surrounded by the protuberances 65, 82; and the convex portion 56 is engaged with the hole 66 to restrict the free rotation of the coil unit 52. Accordingly, the coil unit 52 is restricted its free movement by the solenoid valve cover 60, and the electronic control unit 20 can be transported without any load being applied to the electrical connection of the lead wire 55 to the control board 71.

Next, the coil unit 52 held in the electronic control unit 20 is installed over the valve unit 51, and the solenoid valve cover 60 is assembled with the valve block 30 of the hydraulic unit 10.

FIG. 1 illustrates the assembled unit.

The lower protuberances 84 formed on the coil holding board 80 are elastically contacting the valve block 30. Therefore, the coil holding board 80 is slightly deformed to transfer the reforming force to the bottom surface of the coil unit 52 via the upper protuberances 83. As a result, the frictional engaging force created by the elastic material 22 affecting the upper and lower portions of the coil unit 52 and the coil holding board 80 becomes larger than prior to the assembly of the valve block 30. Thus, the coil 52 is stably held by the solenoid valve cover 60.

Accordingly, in the assembled solenoid valve 50, the coil unit 52 is held by the frictional engaging with a large force by the solenoid valve cover 60. At the same time, since the upper and lower portions of the coil unit 52 are surrounded by the protuberances 65, 82, the electric connection of the lead wire 55 does not receive any load even with the possible vibration caused during the driving of the vehicle in which the unit is installed.

Embodiment 2 of the Invention

The upper and lower portions of the coil 52 are held with the elastic force in the above embodiment. However, the elastic material 22 may be omitted, and the solenoid valve cover 60 may be frictionally engaged only by the coil holding board 80.

Embodiment 3 of the Invention

In order to improve the elastic force of the coil holding board 80, the coil holding board 80 may be designed to have a mesh-like or grid-like surface.

Embodiment 4 of the Invention

In the above-described Embodiment 1, the elastic material 22 is inserted between the lid 61 of the solenoid valve cover 60 and the top portion of the coil unit 52. However, the elastic material 22 may be inserted between the coil holding board 80 and the coil bottom portion of the coil unit 52.

Embodiment 5 of the Invention

In addition, in the above-described Embodiment 1, the upper protuberances 83 and the lower protuberances 84 are positioned as a circle. However, any other different ring-shaped plan of the protuberances 83, 84 may be formed on both surfaces of the coil holding board 80.

Embodiment 6 of the Invention

In the above-described Embodiment 1, the protuberances 83, 84 are formed on both surfaces of the coil holding board 80. However, similarly, the spring force is applied to the coil holding board 80 by forming the upper protuberance 83 or the lower protuberance 84 on either surface of the coil holding board 80, so that the coil unit 52 might be frictionally engaged to be held.

Since this invention is as described above, the invention has the following advantages.

The structure of the invention is very simple in that the elastic material and the coil holding board are provided on one side or both sides of the coil unit; the coil unit is held with the cover by frictionally engaging one or both sides of the coil unit when the coil unit is assembled with the valve unit or disassembled as well as when the electronic control unit or the completed device is transported.

The coil unit may be stably held, which does not cause any breakage of the electric connection of the lead wire, thereby providing a long lasting electric connection.

The coil unit is frictionally engaged with the cover, and the side of the coil unit is also guided by the protuberances. Therefore, the coil unit is reliably held, and this prevents unexpected movement of the coil unit during the transportation or the assembly with the hydraulic unit.

The convex portions of the coil unit are engaged with the holes of the lid, which prevents unexpected rotation of the coil unit due to vibration, etc. and also prevents unusual force possibly applied on the lead wire.

Forming the protuberances on one or both surfaces of the coil holding board increases the holding force of the coil unit to secure the stability of the coil unit.

The elastic material inserted between the lid of the cover and the top portion of the coil unit also functions as a sealing device to seal the hole formed on the lid of the cover besides as a holding device to frictionally engage to hold the coil unit with the cover. Therefore, this invention provides a hydraulic brake control device with a high sealing effect.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic brake control device, which comprises
  a hydraulic unit with a valve unit of a solenoid valve,
  a control board installed in a cover covering one side surface of said hydraulic unit, and
  an electronic control unit with a coil unit of said solenoid valve, wherein
  a coil holding board having an opening through which said valve unit is inserted such that said coil holding board completely encompasses said valve unit, elastically contacting a bottom portion of said coil unit and is attached at the opening side of said cover and
  said coil unit is frictionally engaged by said coil holding board and a lid of said cover.

2. A hydraulic brake control device, which comprises
  a hydraulic unit with a valve unit of a solenoid valve,
  a control board installed in a cover covering one side surface of said hydraulic unit, and
  an electronic control unit with a coil unit of said solenoid valve, wherein
  a coil holding board having an opening through which said valve unit is inserted such that said coil holding board completely encompasses said valve unit, is attached at the opening side of said cover,
  said coil unit is installed between a lid of said cover and said coil holding board,
  an elastic material is inserted between a top portion of said coil unit and said lid or between a bottom portion of said coil unit and said coil holding board, and said coil unit is frictionally engaged by said coil holding board and said lid.

3. A hydraulic brake control unit as claimed in claim 1, wherein protuberances are formed on one side of said coil holding board and said coil holding board has an elastic effect by being abutted against said bottom surface of the coil unit or a valve block of said hydraulic unit via said protuberances.

4. A hydraulic brake control unit as claimed in claim 1, wherein protuberances are formed on one side of said coil holding board and said coil holding board has an elastic effect by being abutted against said bottom surface of the coil unit or a valve block of said hydraulic unit via said protuberances.

5. A hydraulic brake control unit as claimed in claim 1, wherein a hole is formed in said lid of the cover, into which a convex portion of said coil unit is engaged and the rotation of said coil unit is restricted by the enaging of said convex portion of said coil unit into said hole of said lid of the cover.

6. A hydraulic brake control unit as claimed in claim 1, wherein a cavity is formed on the inner circumference of the side surface of said cover, and the periphery of said coil holding board is engaged in said cavity.

7. A hydraulic brake control device, which comprises a hydraulic unit with a valve unit of a solenoid valve, a control board installed in a cover covering one side surface of said hydraulic unit, and an electronic control unit with a coil unit of said solenoid valve, wherein a coil holding board having an opening through which said valve unit is inserted such that said coil holding board completely encompasses said valve unit and elastically contacts a bottom portion of said coil unit, is attached at the opening side of said cover, said coil unit is installed between a lid of said cover and said coil holding board, an elastic material is inserted between a top portion of said coil unit and said lid or between a bottom portion of said coil unit and said coil holding board, and said coil unit is frictionally engaged by said coil holding board and said lid.

8. A hydraulic brake control unit as claimed in claim 7, further comprising a plural number of protuberances to fix the position of said coil unit at said lid of the cover and said coil holding board.

9. A hydraulic brake control unit as claimed in claim 7, wherein protuberances are formed on both surfaces of said coil holding board and said coil holding board has an elastic effect by being abutted against said bottom surface of the coal unit and a valve block of said hydraulic unit via said protuberances.

10. A hydraulic brake control unit as claimed in claim 7, wherein protuberances are formed on both surfaces of said coil holding board and said coil holding board has an elastic effect by being abutted against said bottom surface of the coil unit and a valve block of said hydraulic unit via said protuberances.

11. A hydraulic brake control unit as claimed in claim 7, wherein a hole is formed in said lid of the cover, into which a convex portion of said coil is engaged, the rotation of said coil unit is restricted by the engaging of said convex portion of said coil unit into said hole of said lid of the cover, and an elastic material with a sealing effect is provided between said lid of the cover and said top of the coil unit.

12. A hydraulic brake control unit as claimed in claim 7, wherein a cavity is formed on the inner circumference of the side surface of said cover, and the periphery of said coil holding board is engaged in said cavity.

\* \* \* \* \*